(12) United States Patent
Sirocchi

(10) Patent No.: US 8,104,602 B2
(45) Date of Patent: Jan. 31, 2012

(54) APPARATUS AND METHOD FOR CONTINUOUS LOADING AND ACCUMULATION OF ROWS OF SUSPENDEDLY HANDLED ITEMS

(75) Inventor: Filippo Sirocchi, Parma (IT)

(73) Assignee: Emmeti S.p.A., Montecchio Emilia (Reggio Emilia) (IT)

( * ) Notice: Subject to any disclaimer, the term of this patent is extended or adjusted under 35 U.S.C. 154(b) by 550 days.

(21) Appl. No.: 12/301,521

(22) PCT Filed: May 17, 2007

(86) PCT No.: PCT/EP2007/054803
§ 371 (c)(1), (2), (4) Date: Nov. 19, 2008

(87) PCT Pub. No.: WO2007/135079
PCT Pub. Date: Nov. 29, 2007

(65) Prior Publication Data
US 2009/0116950 A1    May 7, 2009

(30) Foreign Application Priority Data
May 22, 2006  (IT) .............................. PR2006A0046

(51) Int. Cl.
B65G 47/26    (2006.01)

(52) U.S. Cl. ...................................... 198/432; 198/433

(58) Field of Classification Search .................. 198/432, 198/433, 429, 678.1, 459.1
See application file for complete search history.

(56) References Cited

U.S. PATENT DOCUMENTS

| 3,209,923 | A | * | 10/1965 | Gunter Bargel et al. | ....... 198/432 |
| 3,805,943 | A | * | 4/1974 | Warren | ........................ 198/432 |
| 5,381,884 | A | * | 1/1995 | Spatafora et al. | ............ 198/433 |
| 5,794,756 | A | * | 8/1998 | Taylor et al. | .................. 198/429 |
| 7,900,766 | B2 | * | 3/2011 | Takayama et al. | ......... 198/419.3 |
| 2003/0057058 | A1 | * | 3/2003 | Iwasa | ........................ 198/419.3 |

FOREIGN PATENT DOCUMENTS

| DE | 299 05 429 | 5/2000 |
| DE | 202 20 048 | 5/2004 |

OTHER PUBLICATIONS

International Search Report dated Oct. 16, 2007, from corresponding PCT application.

* cited by examiner

Primary Examiner — James R Bidwell
(74) Attorney, Agent, or Firm — Young & Thompson

(57) ABSTRACT

An apparatus for continuous loading and accumulation of rows of suspendedly handled items includes a feed jig at a top of the apparatus with one or more feed channels having grippers for holding the row, and a continuous-motion loader at a bottom of the apparatus having panels or walls on an outer periphery to define a plurality of passageways, wherein the continuous-motion loader has a length defining a row loading area, which is defined by the feed jig, and a pickup area for the rows so loaded, external to the feed jig.

23 Claims, 3 Drawing Sheets

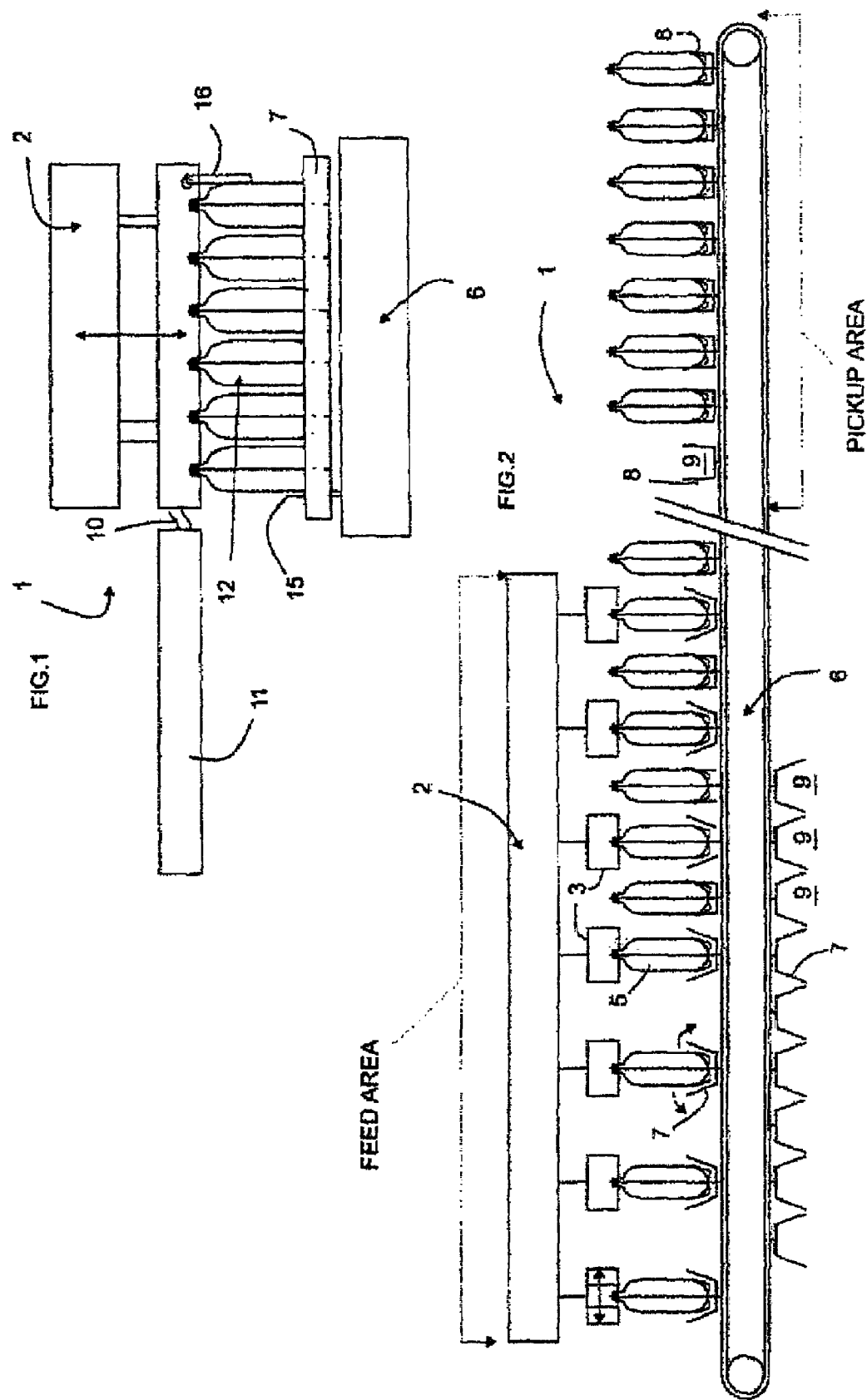

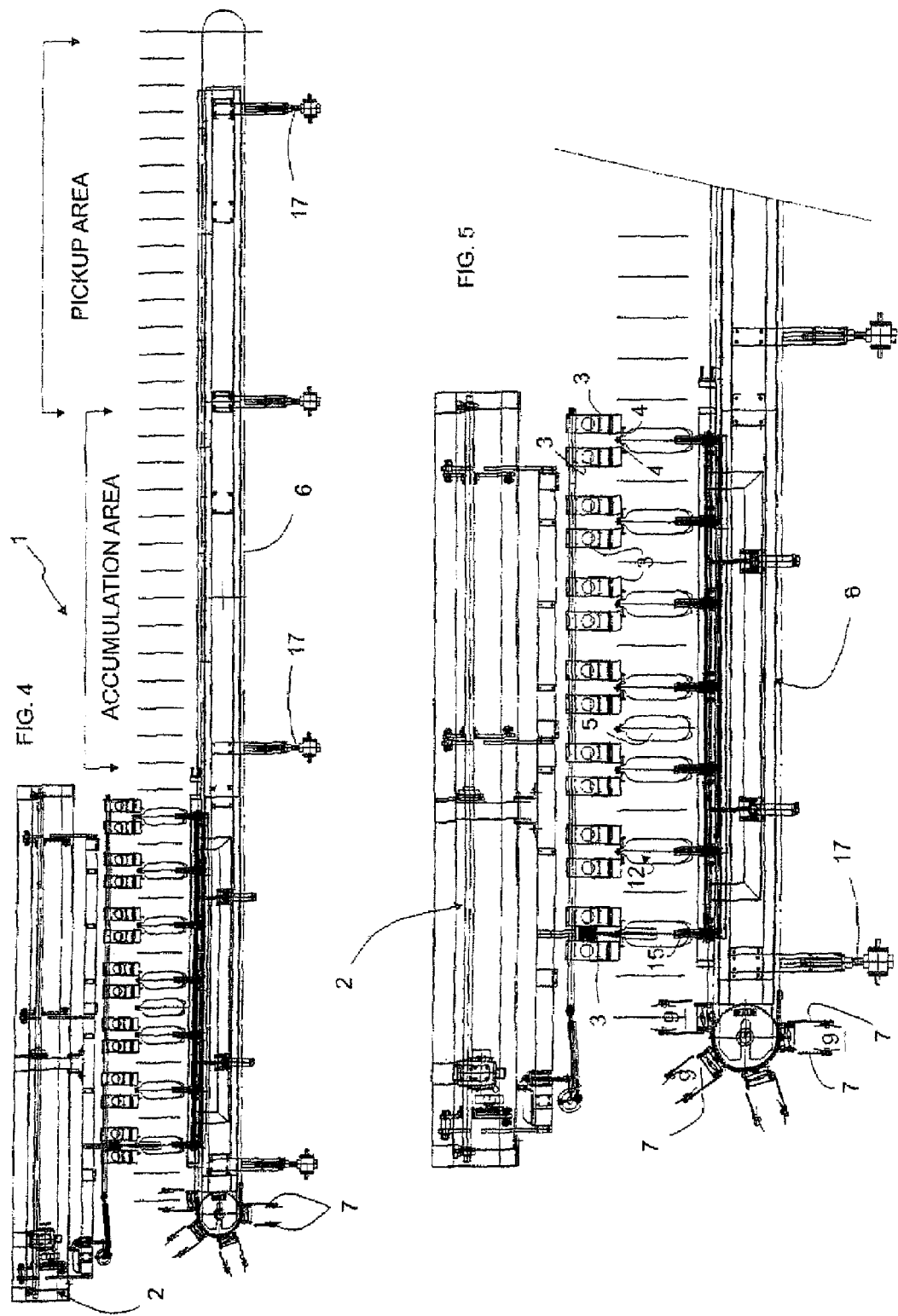

APPARATUS AND METHOD FOR CONTINUOUS LOADING AND ACCUMULATION OF ROWS OF SUSPENDEDLY HANDLED ITEMS

The present application is a National Stage Application of PCT/EP2007/054803, filed on May 17, 2007, which claims the benefit of PR2006A000046, filed on May 22, 2006.

FIELD OF THE INVENTION

The present invention relates to an apparatus and a method for continuous loading and accumulation of rows of suspendedly handled items.

RELATED ART

A movable transfer head picks up such rows and transfers them to a special palletizing station.

The items mentioned herein are namely light-weight and unstable plastic bottles, whose neck has a collar for easier transportation and gripping.

An example of the prior art is known from EP 1342681, which discloses a palletizer for suspendedly handled items, comprising a loading carriage with a plurality of parallel horizontal passageways for receiving the items to be handled; the movable transfer head fits from above, though the top of the passageways, between pairs of upper guides in spaced apart relationship, and picks up the items to move them together to the next station.

It is understood from the above document that the loading carriage which receives the items may be displaced in reciprocating motion for all loaders to be served by the feed channels.

A first drawback of the prior art is that the loading step is stopped as the upper grippers open for the head to carry out the pickup step in the alignment position.

SUMMARY OF THE INENTION

The object of this invention is to provide an apparatus for performing rows of items to be palletized and suspendedly handled as claimed below.

Advantages include a higher productivity, the apparatus having a continuous operation thanks to a row conveyor carpet of sufficient length to separate the loading and row-forming area from the pickup area by the pickup head.

Another advantage is given by the provision of air-operated row conveying channels which utilize the air of upstream lines for checking, removing and filling again the rows.

These objects and advantages are achieved by the apparatus for performing rows of items to be palletized and suspendedly handled according to this invention, which is characterized by the annexed claims.

BRIEF DESCRIPTION OF THE DRAWINGS

These and other features will be more apparent from the following description of a few embodiments, which are shown by way of example and without limitation in the accompanying drawings, in which:

FIG. 1 is a front schematic view of a loading and accumulating apparatus according to the present invention, FIG. 2 is a side elevation view of the apparatus as schematically shown in the preceding view, FIG. 4 is a side elevation view of the apparatus as shown in FIG. 3, FIG. 5 shows a detail of the feed area of the present apparatus.

DETAILED DESCRIPTION

Figure 3:
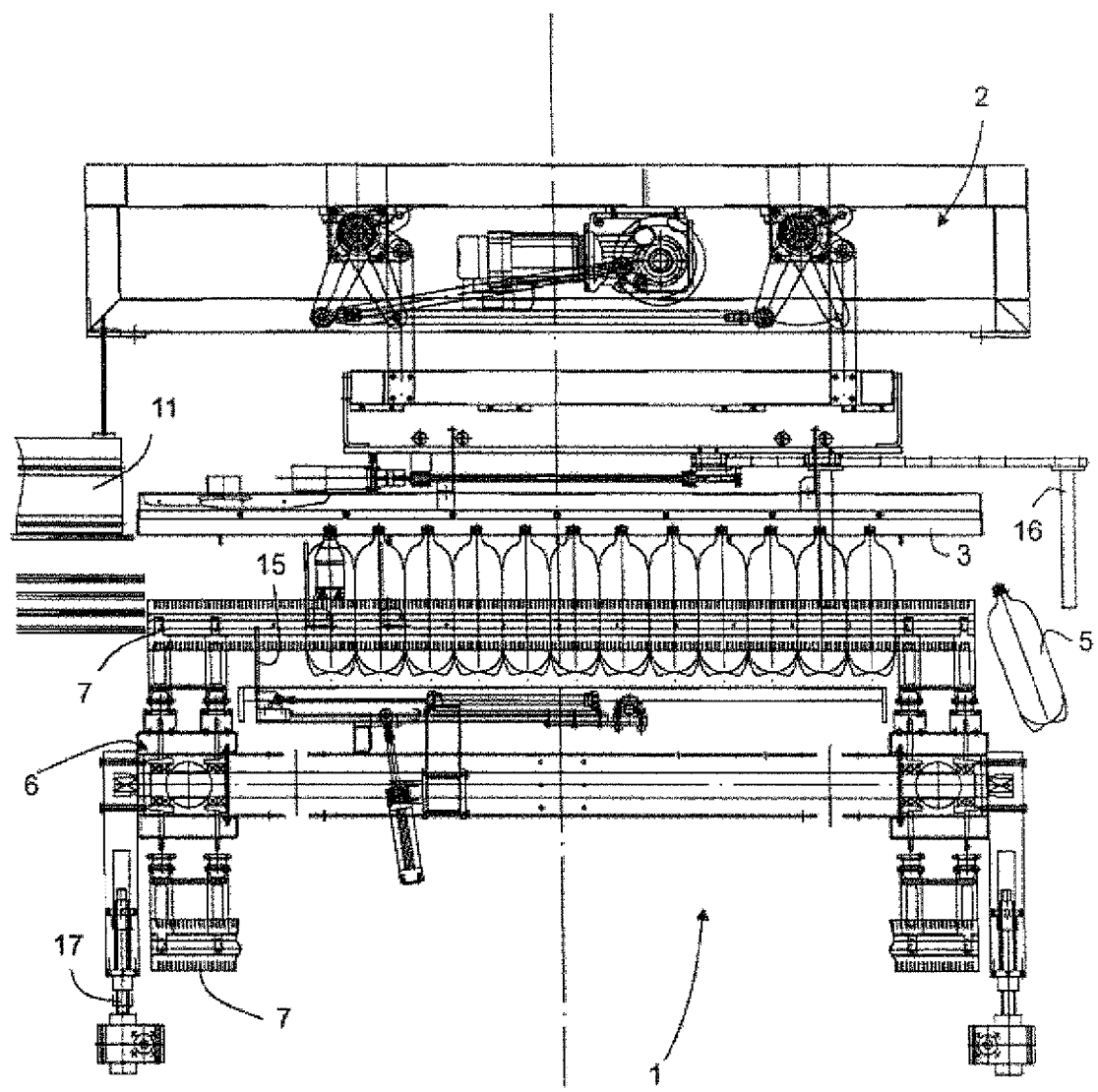
FIG. 3 is a front view of an embodiment of the apparatus.

Referring to FIGS. 1, 2, 3, 4 and 5, numeral 1 generally designated an apparatus for continuous loading and accumulation of rows of suspendedly handled items comprising, at the top, a feed jig 2 with one or more feed channels 3 having air conveying means and grippers 4 for holding the items 5 and, at the bottom, a continuous-motion loader 6 having movable panels 7 or fixed walls 8 on the outer periphery to define a plurality of passageways 9 as better explained below.

The feed channels 3 are provided in a smaller number than the passageways 9, with a center-to-center distance that is a multiple of that of the underlying passageways 9; they further include flexible conduits 10 connected to the conveyors 11 of the upstream line, wherefrom they receive the air required for carrying the items 5.

The feed channels 3 will be obviously held in line with the corresponding underlying passageways 9 so that the line 12 of items can be properly fitted in both; they have such an arrangement that the feed direction of the items is perpendicular to the feed direction of the continuous motion loader.

The continuous-motion loader 6 is of such a length as to define a row loading area, defined by the feed jig 2, and a row pickup area external to such jig 2: an additional section may be provided between said feed area and said pickup area for maintenance and accumulation of the loaded rows 12 of items.

If the passageways 9 are formed by walls 8, these may be vertically removable and include a lower base for supporting the introduced row 12.

However, if the passageways 9 are formed by panels 7, these may be movable and conveniently controlled by solenoid valves or by other means to clamp and/or support the row as needed or to release it to allow it to be gripped (in the pickup area) and/or introduced (in the loading area).

Still referring to the above case, means are installed along the continuous-motion loader 6 such as pneumatic control cylinders which drive the corresponding panels 7 closed or open, according to the type of current operation and particularly to the position taken by the row 12, i.e. either in the loading area or in the release/gripping position by the palletizing head associated to the preformer.

Movable panels 8 and fixed walls 7 further include a timing system, which is used for distance adjustment for controlling the opening of the passageway 9 according to the different sizes of items to be handled.

As mentioned above, the feed channels 3 receive air through the flexible conduits 10 connected to the conveyors 11 of the upstream line: a gate (not shown) for each channel 3 controls the flow by adjusting the flow rate for allowing introduction of rows of items 5 or later ejection thereof.

The apparatus 1 further comprises:
at the bottom, means 15 for compacting and checking the length of the introduced row 12, said means 15 being located in position with respect to the feed channel and operating on the corresponding passageway 9,
at the top, a means 16 for positioning the introduced row 12; such means 16 being movable or rotatable to allow ejection of the rows 12 that have been judged as being non-conforming rows.

In case of wrong reading by the lower check means 15, the row positioning and ejection means 16 will be controlled to open, by the corresponding air-operated feed channels 3.

For the apparatus 1 to be suitable to operate with items 5 of multiple sizes, adjustment jacks 17 are mounted to the continuous-motion loader 6, to be controlled by a motor for height adjustment of the passageways 9.

Equivalent hydraulic, mechanical or pneumatic means may be provided instead of the jacks 17.

Likewise, the feed channels 3 are provided with a system or a device for adjusting the distances between the grippers 4 for holding items 5.

Also, the feed jig 2 has means for opening the feed channels 3 (and the grippers 4 for holding the rows 12) and means for lifting or displacing the jig 2 thereby allowing the rows to be carried by the continuous-motion loader 6 to the pickup area.

The method for continuous loading and accumulation of rows of suspendedly handled items according to the present invention is summarized below.

It includes the steps of introducing one or more rows 12 of items 5 along one or more feed channels 3 using grippers 4 for holding the items, the channels 3 having an air conveying system;

supporting and/or holding in aligned positions each row 12 so introduced in a series of passageways 9 formed on a continuous-motion loader 6 under said feed channels 3, after opening and releasing the feed channels 3, feeding each row 12, by driving the continuous-motion loader 6, to a pickup area.

As mentioned above, upon introduction of the rows 12, the channels 3 and the grippers 4 are lowered but, once the items are filled in, they will be opened and raised clear to allow displacement of the loaded rows 12.

Each time that the rows 12 are loaded, the continuous-motion loader 6 covers a predetermined feed distance, which is a function of the number of feed channels 3; as it reaches its position, the feed jig 2 which has closed its grippers 4, is lowered.

Gaps may be optionally provided between the rows 12.

A row accumulation area may be obviously provided before the pickup area, using a longer continuous-motion loader 6.

Furthermore, the method includes the step of compacting or controlling the length of the row introduced in the feed channels and, whenever such length is unacceptable, the step of ejecting the row using the air conveying system of the row holding grippers.

The items are introduced in the feed channels using one or more external conveying lines.

Each row may be supported as follows:

either by two opposed side walls 8 and a bottom support base, said walls defining a passageway parallel to the item introduction direction, or by a corresponding gripper means, comprising panels 7 or jaws for clamping or releasing the rows, the panels being parallel to the item introduction direction; in the loading area these panels are opened apart to allow introduction of the row, and are further drawn closer before feeding to the next step.

Thanks to the present method and apparatus 1 a desired amount of rows can always be picked up, as they have been prepared in the pickup area and in the accumulation area, if any: this allows separation of the preformation station from the pickup station, and the rows may be simultaneously introduced and picked up.

Here, unlike the conventional method, which provides removal of the preformed layer, once the layer has been picked up, other rows remain on the continuous-motion loader.

The rows will be thus picked up from the loader by a suitable gripping head between the bottle necks.

For the rows to be released, the panels 7 of the passageways have to be opened apart in the pickup area or, if fixed walls 8 are used, the rows will be picked up by extraction.

Preferably, the panels 7 will be controlled by solenoid valves.

The apparatus 1 as shown will also be equipped with all the systems that are typically used in similar machines, such as star wheels, allowing to count the items in the row, controlling or counting photocells, ionizing units having the function of eliminating the static charge and else.

When using the solution with the continuous-motion loader 6 and movable panels 7 having the function of clamping the items at their bases, a check surface is preferably introduced below them to support the items during pick up of the layer by the transfer head.

While this surface is integral with the continuous-motion loader, it allows independent height adjustment which may be manual or motor driven and controlled by appropriate encoders.

Such surface may be located at the pickup and/or accumulation areas.

Finally, pickup may occur either in the pickup area and/or also in the accumulation area, when needed.

The invention claimed is:

1. An apparatus (1) for continuous loading and accumulation of rows (12) of suspendedly handled items (5), comprising:

a feed jig (2) at a top of the apparatus with one or more feed channels (3) having grippers (4) for holding the row (12) of items; and a continuous-motion loader (6) at a bottom of the apparatus and having panels (7) or walls (8) on an outer periphery to define a plurality of passageways (9), wherein said continuous-motion loader (6) has a length defining a row loading area, which is defined by the feed jig, and a pickup area for the rows (12) of items so loaded, external to said feed jig (2).

2. The apparatus (1) as claimed in claim 1, wherein the continuous-motion loader has an additional section between said feed area and said pickup area for maintenance and accumulation of the loaded rows of the items.

3. The apparatus (1) as claimed in claim 1, wherein the walls (8) of the plurality of passageways (9) are vertically removable and have a lower base therebetween for supporting an introduced row (12) of the items.

4. The apparatus (1) as claimed in claim 1, wherein the panels (7) of the plurality of passageways (9) are movable for clamping and/or supporting the row (12) of the items or releasing the row of the items to allow the row of the items to be gripped and/or introduced.

5. The apparatus (1) as claimed in claim 3, further comprising a system for timing and adjusting distances between the panels (7) or walls (8) to control an opening of the plurality of passageways (9).

6. The apparatus (1) as claimed in claim 1, wherein the feed channels (3) include flexible conduits (10) connected to conveyors (11) of an upstream line, wherefrom the flexible conduits receive air for carrying the items (5).

7. The apparatus (1) as claimed in claim 1, wherein each of the plurality of passageways (9) has a bottom means (15) for compacting and checking a length of the introduced row of the items.

8. The apparatus as claimed in claim 1, wherein each of the one or more feed channels (3) has a means (16) for positioning the introduced row of the items, said means for positioning being movable or rotatable to allow ejection of the rows of the items that have been judged as being non-conforming rows of the items.

9. The apparatus (1) as claimed in claim 1, wherein the feed jig (2) has means for opening the one or more feed channels (3) and the grippers (4) for holding the rows of the items and means for lifting or displacing said jig thereby allowing the rows of the items to be carried by the continuous-motion loader (6).

10. The apparatus (1) as claimed in claim 1, wherein the one or more feed channels (3) have a center-to-center distance that is a multiple of a center-to-center distance of the plurality of passageways (9) of the continuous-motion loader (6).

11. The apparatus (1) as claimed in claim 1, wherein the continuous-motion loader (6) has hydraulic, mechanical or pneumatic means (17) for adjustment of a height of said continuous-motion loader (6) from the ground to define a varying distance from the one or more feed channels.

12. The apparatus (1) as claimed in claim 1, wherein the one or more feed channels (3) have a system for adjusting a distance between the grippers (4).

13. A method for continuous loading and accumulation of rows of suspendedly handled items, comprising steps of:
introducing one or more rows of items along one or more feed channels using grippers for holding the items;
supporting and/or holding in aligned positions each row of the items so introduced in a series of passageways formed on a first continuous-motion loader under said one or more feed channels, after opening and releasing the one or more feed channels,
feeding each row of the items, by driving the continuous-motion loader, to a pickup area.

14. The loading method as claimed in claim 13, wherein a row accumulation area is provided before the pickup area, said pickup area being formed using a second continuous-motion loader that is longer than the first continuous-motion loader.

15. The loading method as claimed in claim 13, further comprising a step of checking a length of the row of the items introduced in the one or more feed channels and, whenever such row length is unacceptable, ejecting the row of the items is controlled using the grippers.

16. The loading method as claimed in claim 13, wherein the items are introduced in the one or more feed channels from one or more external conveying lines.

17. The loading method as claimed in claim 13, wherein each of the one or more rows of the items is supported by two opposed side walls and a bottom support base, said side walls defining a passageway parallel to a direction of the introducing of the items.

18. The loading method as claimed in claim 13, wherein each of the one or more rows of the items is supported by a corresponding gripper means, comprising panels or jaws for clamping or releasing the one or more rows of the items, the panels being parallel to the direction of the introducing of the items.

19. The loading method as claimed in claim 13, further comprising covering a predetermined feed distance, which is a function of a total number of the one or more feed channels.

20. The loading method as claimed in claim 13, further comprising providing gaps between the one or more rows of the items.

21. The loading method as claimed in claim 14, further comprising picking up of the row of the items either in the pickup area and/or in the accumulation area, when needed.

22. The apparatus (1) as claimed in claim 1, wherein the grippers (4) are operated by air conveying means.

23. The loading method as claimed in claim 13, wherein the grippers are operated using an air conveying system.

* * * * *